(12) United States Patent
Markley

(10) Patent No.: US 7,306,253 B2
(45) Date of Patent: Dec. 11, 2007

(54) AUTOMOTIVE COUPLING DEVICE

(75) Inventor: Martin Joseph Markley, Overland Park, KS (US)

(73) Assignee: Martin J. Markley, Overland Park, KS (US)

( * ) Notice: Subject to any disclaimer, the term of this patent is extended or adjusted under 35 U.S.C. 154(b) by 293 days.

(21) Appl. No.: 11/210,297

(22) Filed: Aug. 24, 2005

(65) Prior Publication Data

US 2007/0045985 A1    Mar. 1, 2007

(51) Int. Cl.
    *B60D 1/02*    (2006.01)
(52) U.S. Cl. .................................... 280/480
(58) Field of Classification Search ........... 280/480, 280/480.1
See application file for complete search history.

(56) References Cited

U.S. PATENT DOCUMENTS 2,988,384 A * 6/1961 Neff ..................... 280/480
5,308,101 A * 5/1994 Monty ................. 280/480.1
5,350,186 A * 9/1994 Hull et al. ............ 280/480.1
5,476,280 A * 12/1995 MacMullan .......... 280/480.1

FOREIGN PATENT DOCUMENTS

JP      07132716 A * 5/1995

* cited by examiner

*Primary Examiner*—Kevin Hurley
(74) *Attorney, Agent, or Firm*—Intellectual Property Center, LLC; Arthur K. Shaffer

(57) ABSTRACT

An automotive coupling device adapted for use with a towing vehicle having a standard towing connector including a tubular insert with a distal and a proximate end, the distal end adapted for receipt by the towing connector. A locking element for securely locking the insert to the towing connector is also provided along with an elongated strap extending from the insert to a towed vehicle. The elongated strap includes a first and second end, the first end connected to the insert and the second end adapted for connection to the towed vehicle.

12 Claims, 4 Drawing Sheets

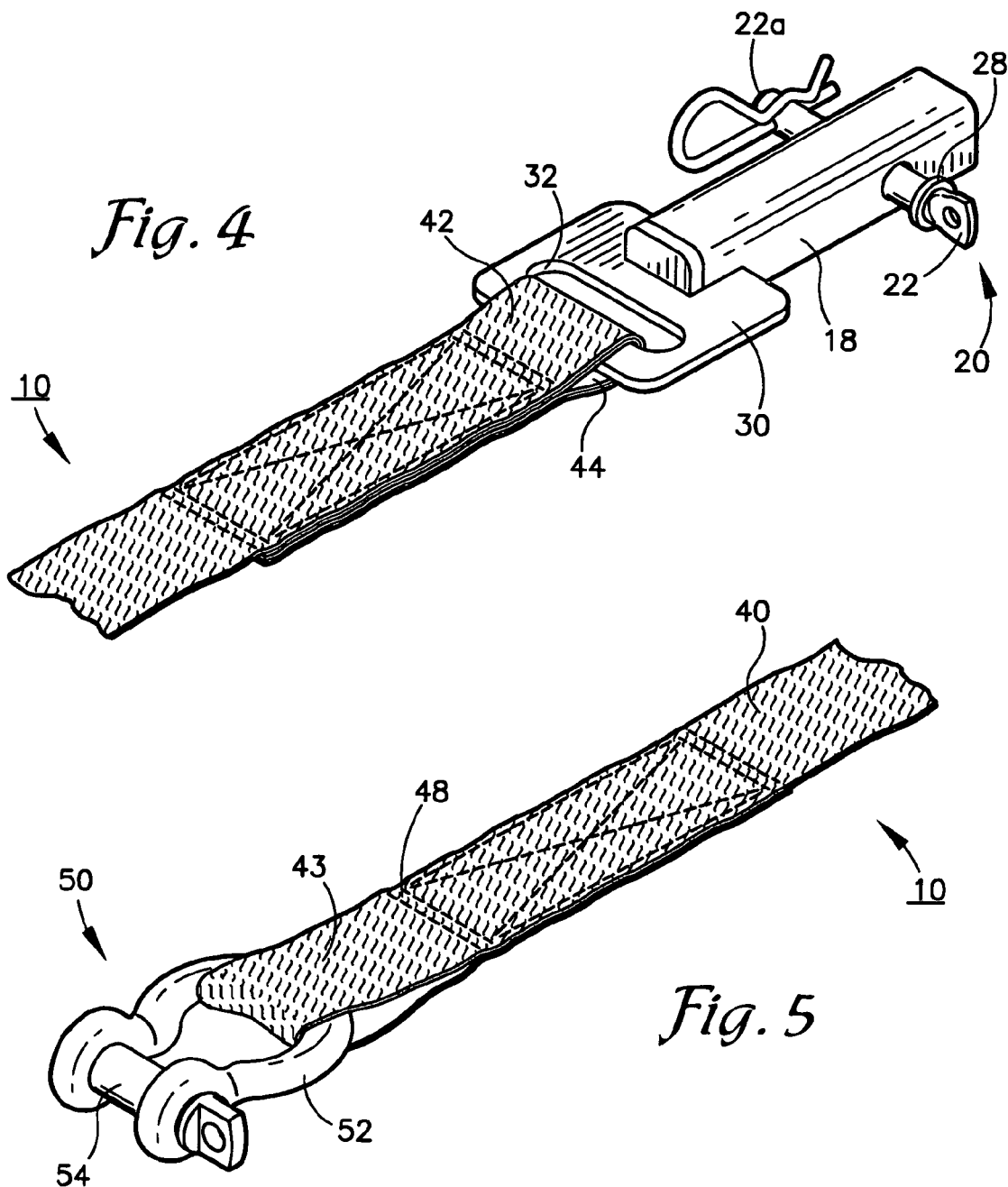

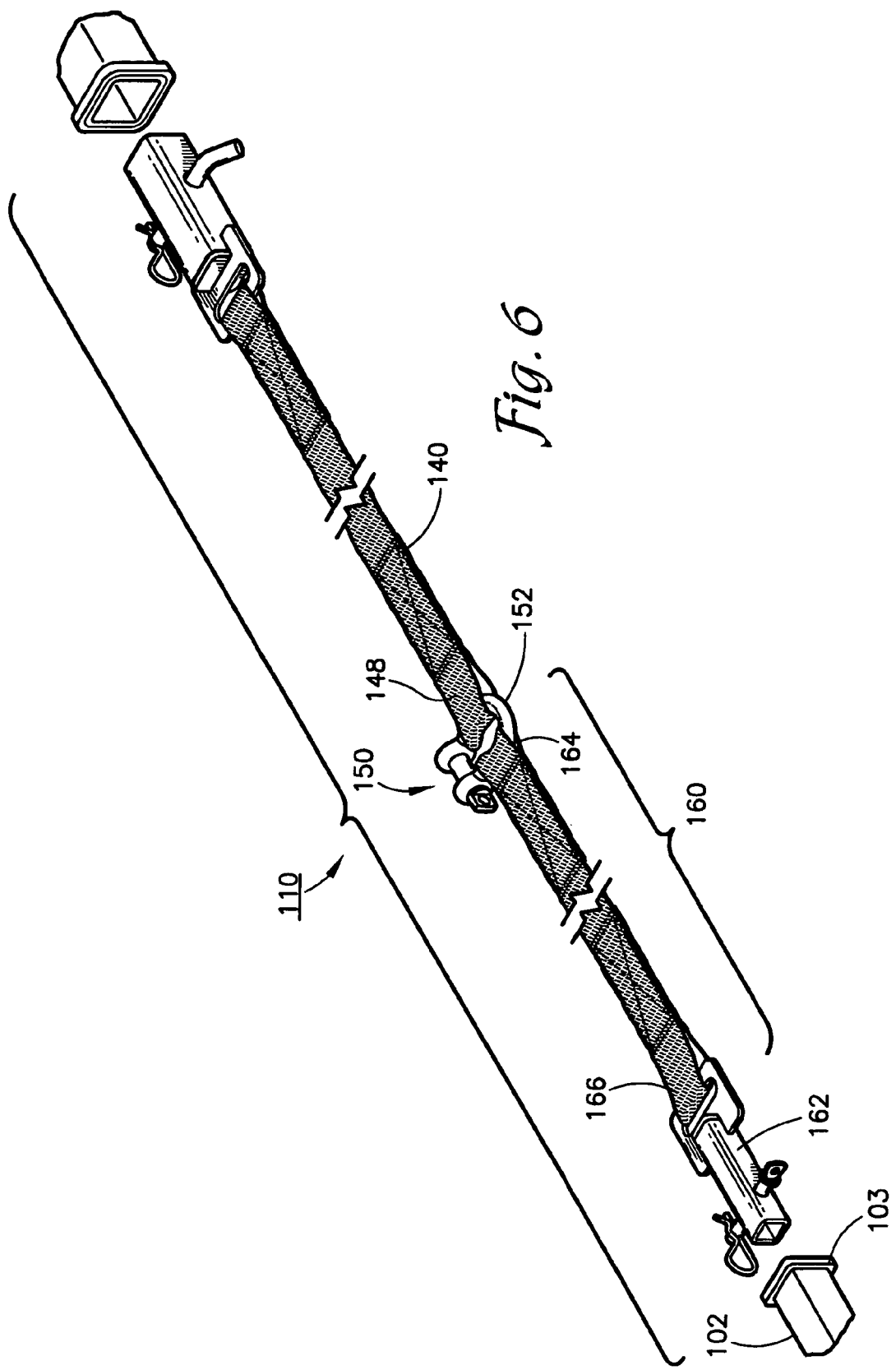

AUTOMOTIVE COUPLING DEVICE

FIELD OF THE INVENTION

The present invention relates generally to vehicle couplings and more particularly to a towing device detachably coupled to a vehicle for moving said vehicle.

BACKGROUND OF THE INVENTION

Vehicles are transported across the streets and highways on a daily basis around the world. Sometimes a vehicle may become stranded or slip off the road during its travels and may need assistance in the form of a tow. The ability to tow a vehicle may require a specialized vehicle with special equipment. However, in some cases a standard vehicle may have sufficient towing capacity to assist the stranded vehicle. Therefore it would be beneficial to have a vehicle coupling device which allowed the stranded vehicle to be assisted with the use of an easy to use, convenient, compact device for connection to standard tow receivers on a variety of vehicles.

SUMMARY OF THE INVENTION

The present invention provides an automotive coupling device adapted for use with a towing vehicle having a standard towing connector the device including a tubular insert with a distal and a proximate end, the distal end generally adapted for receipt by the towing connector. A locking element is also provided for securely locking the insert to the towing connector. An elongated strap is also provided, the strap extending from the insert to a towed vehicle, the elongated strap having a first and second end, the first end connected to the insert adjacent the proximate end and the second end adapted for connection to the towed vehicle.

BRIEF DESCRIPTION OF THE DRAWINGS

The drawings constitute a part of this invention and include exemplary embodiments of the present invention and illustrate various objects and features thereof.

FIG. 4 is a partial upper perspective view of an alternative configuration of the automotive coupling device.

FIG. 5 is a partial upper perspective view of a coupling structure associated with the automotive coupling device.

FIG. 6 is upper perspective view of the automotive coupling device.

DETAILED DESCRIPTION

I. Introduction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Coupling Device.

Figure 1:
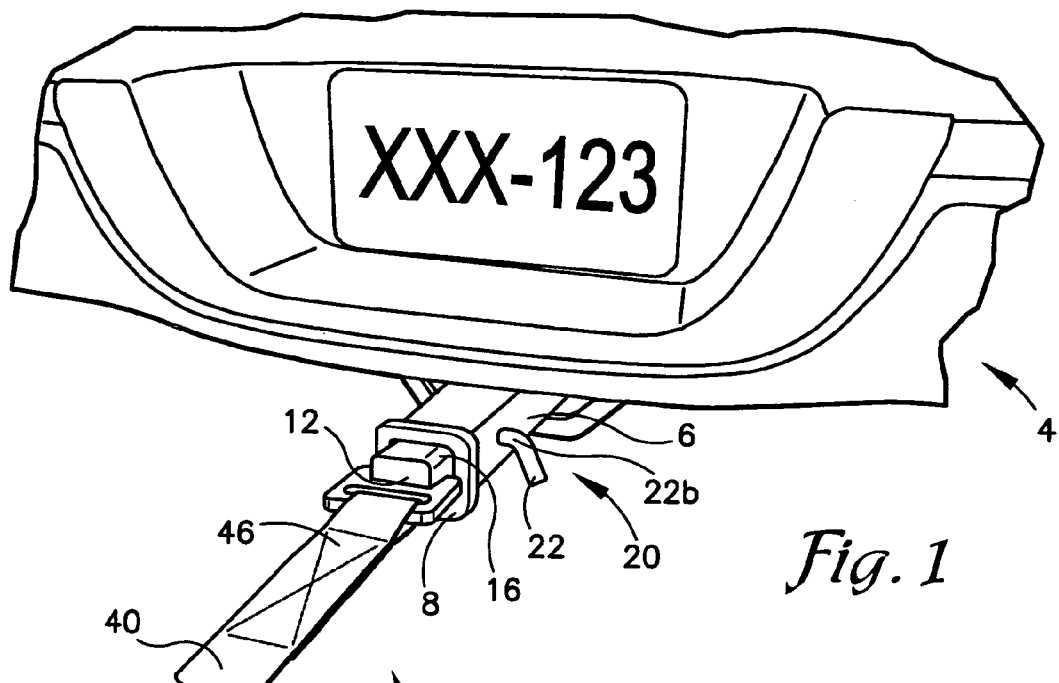
FIG. 1 is a partial rear perspective of an automotive coupling device engaging a towing connector of an automobile.
Figure 2:
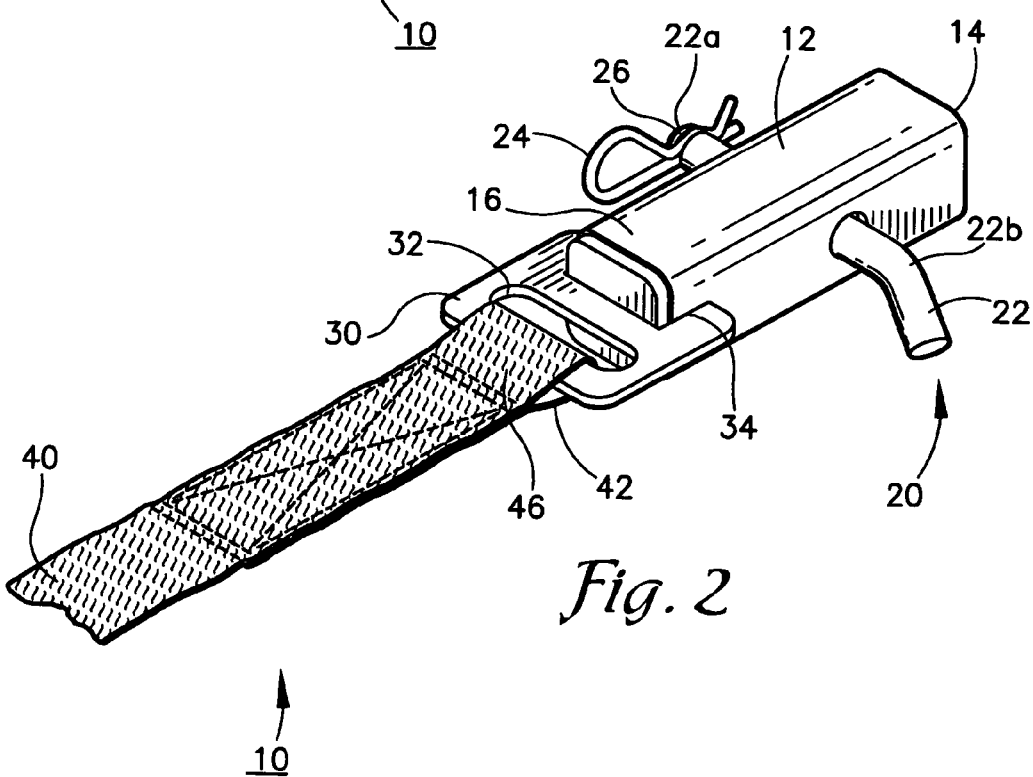
FIG. 2 is a partial upper perspective view of the automotive coupling device.

Referring to FIGS. 1 and 2, an embodiment of the present invention configured as an automotive coupling device is generally indicated by reference numeral 10. Coupling device 10 includes a generally tubular insert 12 having a distal end 14 and a proximate end 16, the distal end 14 being adapted for receipt by a first automotive vehicle 4 having a towing connector 6 being illustrated as generally having a rectangular shaped receiver 8 and being generally connected to the vehicle support (not shown). However, alternative shaped receivers could be provided for use with the present invention, including geometric shapes such as circles and polygons or irregular shaped receivers for use with complementary shaped inserts.

As illustrated in FIG. 1, preferably the tubular insert 12 is received by the rectangular receiver 8, the insert 12 being preferably fabricated from a section of hollow tubular steel for receipt by the towing connector 6. In addition, the insert 12 is secured to the towing connector 6 with a locking element 20 which extends through the insert 12 to engage the towing connector 6. The locking element 20 may include a variety of mechanical locking devices such as but not limited to a pin 22 with a locking clip 24. While the insert 12 is received by the towing connector 6, a pin first end 22a extends into the tow connector 6 and through the insert 12, a pin shoulder 22b being adapted for engaging the outer surface of the tow connector 6. The pin 22 may then be locked into position when the pin first end 22a receives the clip 24. The pin first end 22a is illustrated with a collar 26 adapted for securely receiving the clip 24 discouraging premature release of the clip 24 by the pin 22 while engaging the tow connector 6.

The proximate end 16 of the insert 12 is joined to a connection plate 30 for connecting a first end 46 of an elongated strap 40 to the insert 12 through an elongated passage 32, through the connection plate 30, which is adapted to receive the strap 40. As illustrated, the passage 32 extends horizontally through the connection plate 30 a distance compatible with the width of the elongated strap 40. The strap 40 may be fabricated from a high strength material such as nylon, canvas or leather, but preferably from a ripstop, heat resistant nylon fabric. The strap 40 is shown in FIG. 2 with a loop 42 encircling the passage 32, connecting the strap 40 to the connection plate 30. The connection plate 30 may be integrally connected to the insert 12 or may be mechanically or fusible connected to the insert 12. As an example, a connection joint 34 may be located between the connection plate 30 and the insert 12 for securing the connection plate 30 to the insert 12, with the connection joint being welded.

Figure 3:
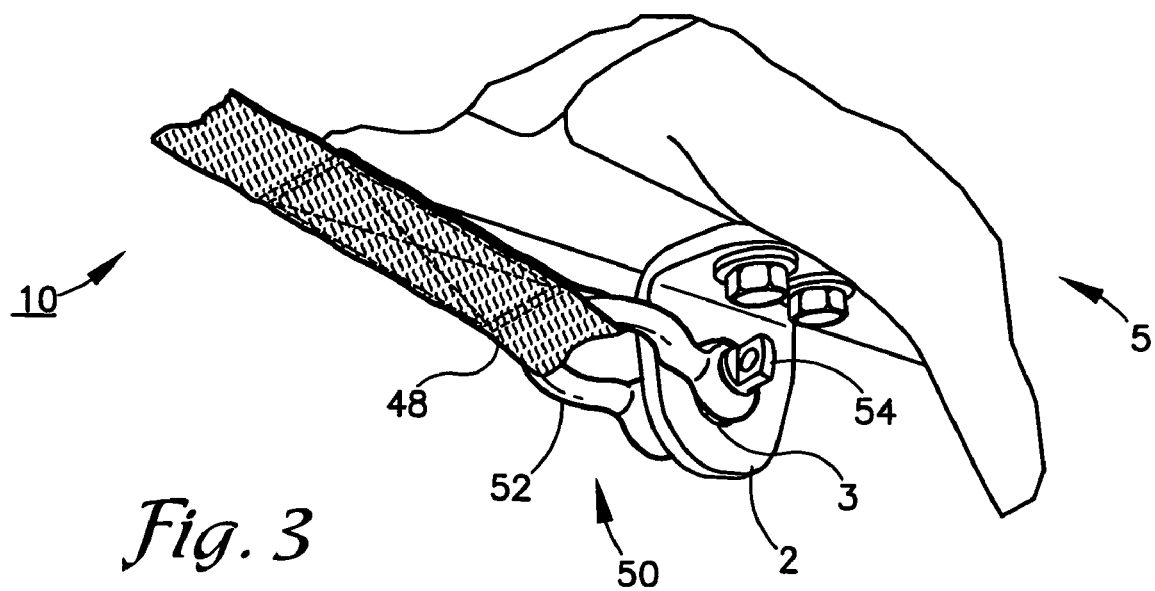
FIG. 3 is a fragmentary view of the underside of a vehicle connection engaging a coupling structure.

FIG. 3 illustrates a second end 48 of the elongated strap 40 connected to a second vehicle 5 adapted for being towed by a coupling structure 50 coupled to a connection point 2 located underneath the second vehicle 5. The connection point 5 may vary depending on the make, model and manufacture of the vehicle. Preferably, the connection point 2 includes an eye 3 adapted for attachment by the coupling device 10. The connection point 2 is illustrative of one connection point 2 configuration; however, different vehicles may have different tow connection configurations.

FIG. 4 illustrates an alternative configuration of the device 10 having a locking element 20 including a pin 22 with a laterally projecting shoulder 28 on a side opposite the pin first end 22a. In addition, an alternative insert 18 is shown configured for alternative towing connectors (not shown). The loop 42, is also illustrated adjacent to a loop support 44, which may be fabricated from synthetic or man-made material such as but is not limited to leather for reinforcing the loop 42 of the elongated strap 40. In this configuration, the loop 42 may be illustrated as generally including an outer layer, the elongated strap 40, and an inner layer, the loop support 44, where the inner layer is folded between the outer layer and the elongated passage 32.

The second end 48 of the elongated strap 40 is illustrated in FIG. 5 connected to the coupling structure 50 which is illustrated as, but not limited to, a clevis structure having a clevis 52 and a clevis pin 54. The coupling structure 50 is generally connected to the elongated strap 40 with a loop 43 formed in association with the second end 48, the loop 43 encircling the clevis 52. The clevis 52 is adapted for connecting said strap second end 48 to the second vehicle's connection point 2 which may be configured a number of different ways, but preferably includes at least one eye 3 for receiving the coupling structure 50.

In operation and referring back to FIGS. 1-3, the coupling device 10 is connected between a first and second vehicle 4, 5. The first end of the elongated strap 46 is connected to the first vehicle 4 by inserting the tubular insert 12 into the towing receiver 8 and securing the tubular insert 12 with the use of the locking element 20 which may include the illustrated pin 22 and locking clip 24. The second end 48 of the elongated strap 40 is adapted for connection to the second vehicle 5, at a connection point 2 associated with the structure of the vehicle 5. At the strap second end 48, a coupling structure is illustrated with the clevis 52 in receipt of the clevis pin 54. The clevis 52 is passed through the eye 3 of the connection point 2 for securing the coupling device 10 to the second vehicle. The clevis pin 54 may optionally be threaded through the ends of the clevis 52 for securing the clevis 52 to the second vehicle 5. Once the coupling device 10 is secured to both vehicles 4, 5, the second vehicle 5 may be engaged for towing by the first vehicle 4. Alternatively, because of the simplicity and adaptability of the coupling device 10, the first vehicle 4 may be used to tow the second vehicle 5.

An alternative embodiment of the coupling device 110 is illustrated in FIG. 6 for connecting a first vehicle to a second vehicle (not shown) having an alternative connection point 102. The connection point 102 illustrated in FIG. 6 includes a generally rectangular receiver 103 adapted for receipt of a rectangular fitting 162. In addition, the alternative embodiment includes a tow extender 160 having a first extension end 164 and a second extension end 166 for extending an elongated strap 140, which may be desired in some situations such as but not limited to when the second vehicle is down a hillside. The rectangular fitting 162 is connected to the tow extender 160 which is connected to a coupling structure 150. The coupling structure 150 joins the first extension end 164 to a second end 148 of the elongated strap 140 providing extended coupling of the first vehicle to the second vehicle. By providing a number of different dimensioned and shaped inserts 162 the coupling device 110 may be configured to tow a number of vehicles having a variety of connection points.

It will be appreciated that various other configurations and embodiments may fall within the scope of the present invention. While certain forms of the present invention have been illustrated and described herein, it is not to be limited to the specific forms or arrangement of parts described and shown.

Having thus described the invention, what is claimed as new and desired to be secured by Letters Patent is as follows:

1. An automotive coupling device adapted for use with a first vehicle having a towing connector, said apparatus comprising:
   a tubular insert having a distal end adapted to be received by said towing connector, and a proximate end,
   an element for locking said insert to the towing connector,
   an elongated strap having a first end connected with said insert adjacent said proximate end thereof, and a second end presented by said strap, and
   a coupling structure on said second end adapted for connection to a second vehicle.

2. The apparatus according to claim 1 wherein the second vehicle is adapted for towing by the first vehicle.

3. The apparatus according to claim 1 wherein the first vehicle is adapted for towing by the second vehicle.

4. The apparatus according to claim 1 further comprising a connection plate having an elongated passage for connecting the strap to the tubular insert.

5. The apparatus according to claim 1 wherein said element includes a pin received by said towing connector through said tubular insert said pin receiving a locking clip at one end thereof.

6. The apparatus according to claim 1, wherein said first end is further comprised of a loop formed in said elongated strap for connecting said strap to said insert.

7. The apparatus according to claim 2 wherein said connection plate further comprises:
   an elongated passage adapted for receipt of said elongated strap, and
   a connection joint located at the junction of said connection plate and said insert for securing said connection plate to said insert.

8. The apparatus according to claim 7 wherein said first end is further comprised of:
   a loop formed in said elongated strap for connecting said strap to said connection plate at said elongated passage, said loop including an outer layer and an inner layer, and
   said inner layer folded between said outer layer and said elongated passage.

9. The apparatus according to claim 8 wherein said inner layer is a leather material.

10. The apparatus according to claim 1 wherein said coupling structure is further comprised of:
    a clevis adapted for joining said strap second end to a connection point of said second vehicle,
    a clevis pin for securing said clevis to said strap second end, and
    a loop for receiving said clevis.

11. An automotive coupling device adapted for use with a first vehicle having a towing connector and a second vehicle having a rectangular receiver, said apparatus comprising:
    a tubular insert having a distal end adapted to be received by said towing connector, and a proximate end,
    an element for locking said insert to the towing connector,
    an elongated strap having a first end connected with said insert adjacent said proximate end thereof, and a second end presented by said strap, and
    a clevis structure connected to said strap second end,
    a rectangular fitting adapted for receipt by the rectangular receiver of the second vehicle, a tow extender having a first extension end and a second extension end extending between said rectangular fitting and said clevis structure, said first extension end having a first extension end loop formed in association therewith for connecting said first extension end of said tow extender to said clevis structure, and said second extension end having a second extension end loop formed in association therewith for connecting said second extension end of said tow extender to said rectangular fitting whereby said coupling device is adapted for connecting a first vehicle to a second vehicle having a rectangular receiver.

12. An automotive coupling device adapted for use with a first vehicle having a towing connector, the apparatus comprising:

a tubular insert having a distal end adapted to be received by the towing connector, and a proximate end, a pin received by the towing connector through the tubular insert, a locking clip secured to one end of the pin for securing the insert to the towing connector, a connection plate having an elongated passage, the connection plate secured to the proximate end of the tubular insert, an elongated strap having a first end with a loop connected through the elongated passage adapted for connecting said strap to said insert and a second end having a second loop presented by the strap, a clevis received by said second loop, the clevis adapted for joining the strap second end to a connection point of the second vehicle, and a clevis pin for securing the clevis to the strap second end for securing the first vehicle to the second vehicle for towing.

* * * * *